United States Patent
Caron et al.

(10) Patent No.: US 9,738,110 B2
(45) Date of Patent: Aug. 22, 2017

(54) SHEET HOLDER

(71) Applicants: Jean Caron, Granby (CA); Alexandre Des Lauriers, Bromont (CA)

(72) Inventors: Jean Caron, Granby (CA); Alexandre Des Lauriers, Bromont (CA)

( * ) Notice: Subject to any disclaimer, the term of this patent is extended or adjusted under 35 U.S.C. 154(b) by 0 days.

(21) Appl. No.: 14/888,086

(22) PCT Filed: May 27, 2014

(86) PCT No.: PCT/CA2014/000462
§ 371 (c)(1),
(2) Date: Oct. 29, 2015

(87) PCT Pub. No.: WO2014/190415
PCT Pub. Date: Dec. 4, 2014

(65) Prior Publication Data
US 2016/0107474 A1    Apr. 21, 2016

(30) Foreign Application Priority Data

May 29, 2013 (GB) .................................. 1309617.7

(51) Int. Cl.
*B42F 15/06*  (2006.01)
*B42F 1/00*  (2006.01)
(Continued)

(52) U.S. Cl.
CPC .............. *B42F 15/066* (2013.01); *B42F 1/00* (2013.01); *B42F 15/06* (2013.01); *F16M 11/041* (2013.01); *F16M 13/02* (2013.01)

(58) Field of Classification Search
CPC .......... B42F 15/066; B42F 15/06; B42F 1/00; F16M 13/02; F16M 11/041
(Continued)

(56) References Cited

U.S. PATENT DOCUMENTS 1,364,190 A * 1/1921 Erickson ................ A47K 10/12
                                                                  211/16
1,417,009 A * 5/1922 Woodward ........... A47G 25/487
                                                                  211/45
(Continued)

FOREIGN PATENT DOCUMENTS

FI   WO 2007045715 A1 *  4/2007  ................ B24F 9/00
JP            10203069        8/1998
(Continued)

OTHER PUBLICATIONS

International Search Report for PCT application PCT/CA2014/000462 filed May 27, 2014, from which the present application claims priority.

*Primary Examiner* — Muhammad Ijaz

(57) ABSTRACT

A sheet holder (100) for holding sheets (50) comprising a housing (101) defining first and second side walls (120 and 110) spaced apart from each other and defining a slot (170) therebetween. The first and second side walls (120 and 110) also define a bottom aperture (172) leading into the slot (170). A plurality of guiding grooves (134) are defined in the first side wall (120) facing the slot (170). The guiding grooves (134) define substantially opposed groove top and bottom ends (136 and 138) and extend further away from the second side wall (110) adjacent the groove top end (136) than adjacent the groove bottom end (138). Holding elements are each at least partially received in a respective one of the guiding grooves (134) and movable therealong. At least part of the holding elements (134) remains in the guiding grooves (134) at all positions therealong.

9 Claims, 11 Drawing Sheets

(51) Int. Cl.
*F16M 11/04* (2006.01)
*F16M 13/02* (2006.01)

(58) Field of Classification Search
USPC ......... 248/316.3, 317, 447.1, 452, 468, 489;
211/45, 50; D19/86
See application file for complete search history.

(56) References Cited

U.S. PATENT DOCUMENTS

| | | | |
|---|---|---|---|
| 1,431,010 A * | 10/1922 | Koons ................... | A47K 10/12 248/316.3 |
| 1,479,243 A * | 1/1924 | Kamrath ................. | A47G 1/21 248/316.3 |
| 1,857,724 A * | 5/1932 | Kaminski ............... | A47G 1/21 211/45 |
| 2,038,043 A | 4/1936 | Hasselblad | |
| 2,231,883 A * | 2/1941 | Caccivio ................. | A47G 1/21 211/32 |
| 2,377,488 A * | 6/1945 | Fugazzi ................. | A47G 1/21 211/45 |
| 2,396,751 A | 3/1946 | Resnick | |
| 2,521,604 A | 9/1950 | Provost | |
| 3,168,954 A * | 2/1965 | Von Herrmann ........ | A47G 1/21 211/50 |
| 3,399,429 A * | 9/1968 | Goodman ................ | A47G 1/21 211/50 |
| 3,434,686 A | 3/1969 | Yoshizaburo | |
| 3,591,013 A * | 7/1971 | Von Herrmann ........ | A47G 1/21 211/50 |
| 3,675,782 A * | 7/1972 | Dudley ................ | B42F 15/066 211/50 |
| 3,754,663 A | 8/1973 | Bittner | |
| 3,814,368 A | 6/1974 | Freed | |
| 4,085,848 A * | 4/1978 | Tsuge ................... | B42F 15/066 211/45 |
| 4,324,337 A | 4/1982 | Hermalahti | |
| D266,858 S * | 11/1982 | Cole ...................... | D19/90 |
| D267,810 S | 2/1983 | Orsos | |
| 4,563,796 A | 1/1986 | Kettlestrings | |
| D284,483 S | 7/1986 | Yang | |
| 4,901,962 A | 2/1990 | Greer | |
| D310,689 S | 9/1990 | Evenson | |
| 4,991,268 A | 2/1991 | Ho | |
| 5,078,358 A * | 1/1992 | Egly ...................... | A47B 19/10 211/89.01 |
| D326,027 S | 5/1992 | Estes | |
| 5,152,490 A * | 10/1992 | Deutsch ................ | A47B 97/04 248/316.3 |
| 5,170,982 A * | 12/1992 | Schultheis ............. | A47K 10/14 211/89.01 |
| 5,251,766 A | 10/1993 | Barry | |
| D354,986 S | 1/1995 | Chu | |
| 5,456,034 A | 10/1995 | Lewis et al. | |
| 5,592,721 A | 1/1997 | Zeller | |
| 5,711,430 A * | 1/1998 | Andersen ................ | A47G 1/21 211/45 |
| 5,745,962 A | 5/1998 | Richter | |
| D398,651 S | 9/1998 | Suzuki et al. | |
| D400,925 S | 11/1998 | McKittrick | |
| D405,828 S | 2/1999 | Richter | |
| 6,302,362 B1 | 10/2001 | Moore | |
| 6,450,471 B1 | 9/2002 | Wear | |
| 6,453,518 B1 * | 9/2002 | Adams ................ | B42F 15/066 24/67.9 |
| 6,554,222 B1 | 4/2003 | Lindow, Sr. | |
| 6,637,716 B2 | 10/2003 | Wear | |
| D534,588 S | 1/2007 | Nuttall | |
| 7,373,748 B2 | 5/2008 | Pitcher et al. | |
| D601,629 S | 10/2009 | Johnson | |
| 7,614,598 B2 | 11/2009 | Smith | |
| D607,057 S | 12/2009 | Kim | |
| D607,058 S * | 12/2009 | Kim ............................. | D19/86 |
| D613,796 S | 4/2010 | Kim | |
| D623,048 S | 9/2010 | Moy | |
| 7,832,063 B2 | 11/2010 | Yoshida | |
| 2003/0024892 A1* | 2/2003 | Macsenti ................ | A47F 5/0884 211/113 |
| 2009/0045314 A1 | 2/2009 | Lien | |
| 2016/0107474 A1* | 4/2016 | Caron ...................... | B42F 1/00 248/316.3 |

FOREIGN PATENT DOCUMENTS

| | | |
|---|---|---|
| JP | H10203069 A * | 8/1998 |
| JP | 2000247080 | 9/2000 |
| WO | 2007045715 | 4/2007 |

* cited by examiner

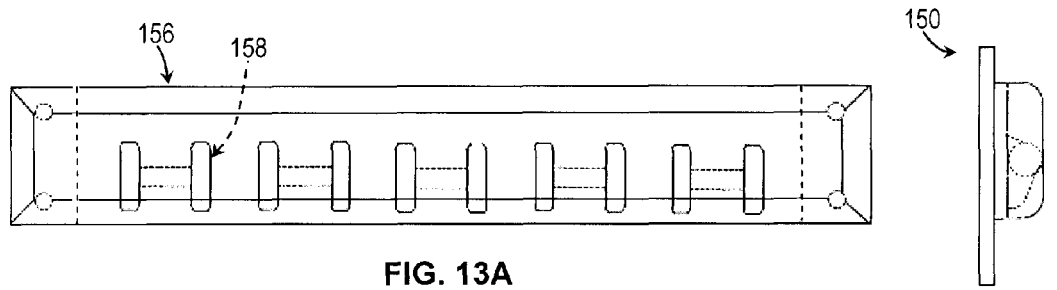
FIG. 13A
FIG. 13B
FIG. 13C
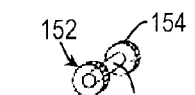
FIG. 13D
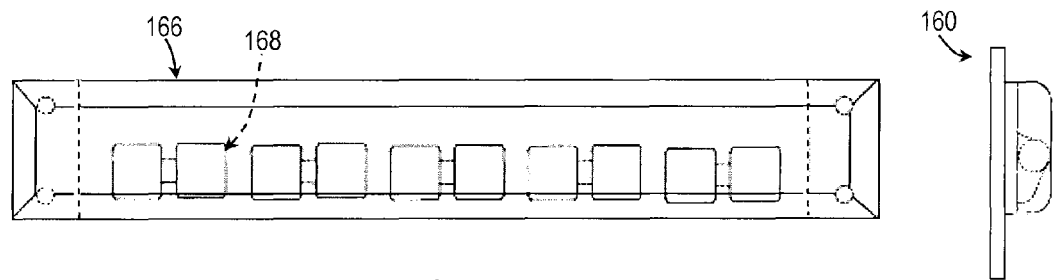
FIG. 14A
FIG. 14B
FIG. 14C
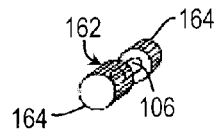
FIG. 14D

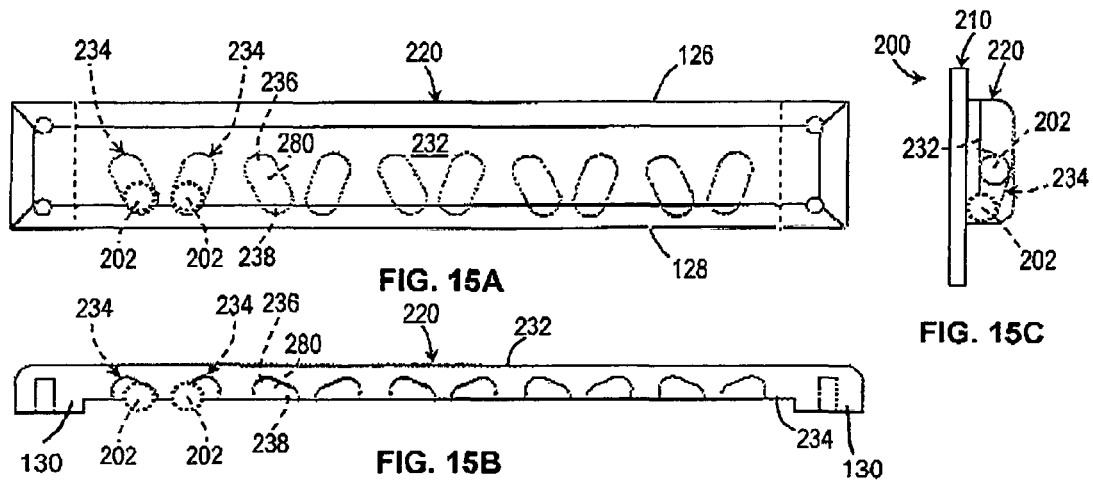
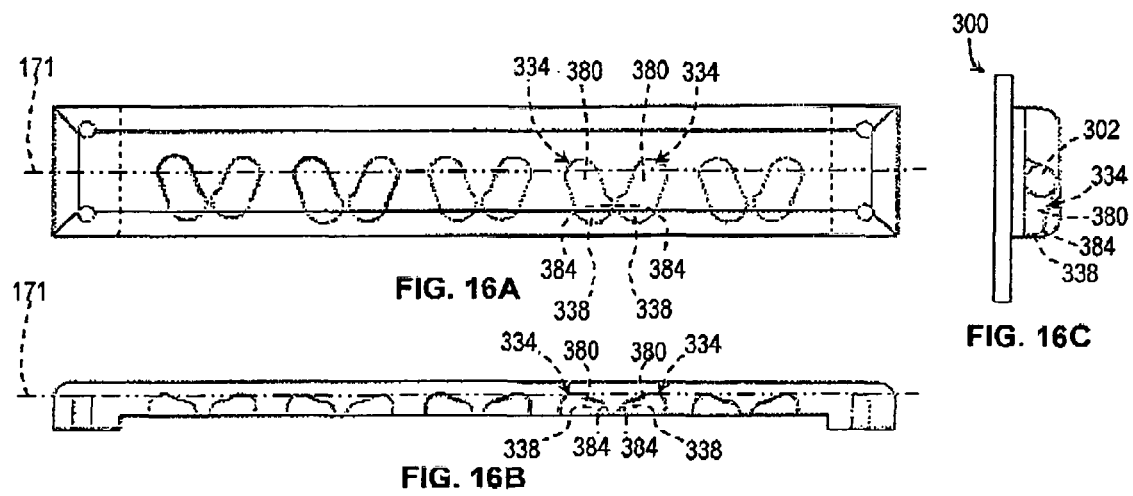

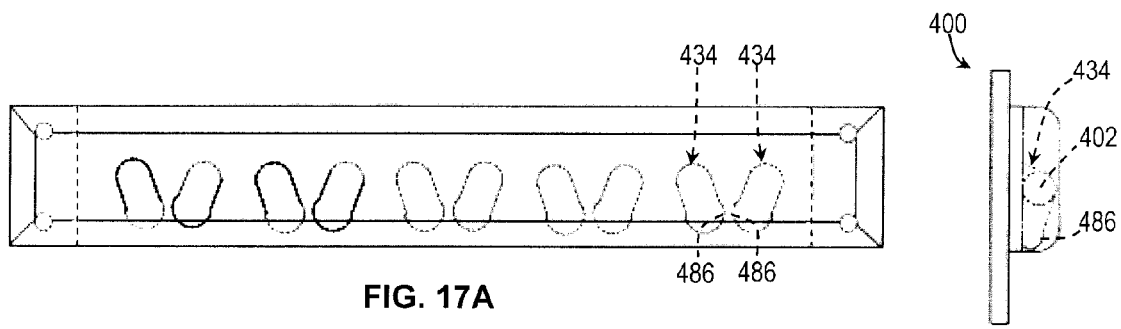
FIG. 17A
FIG. 17B
FIG. 17C
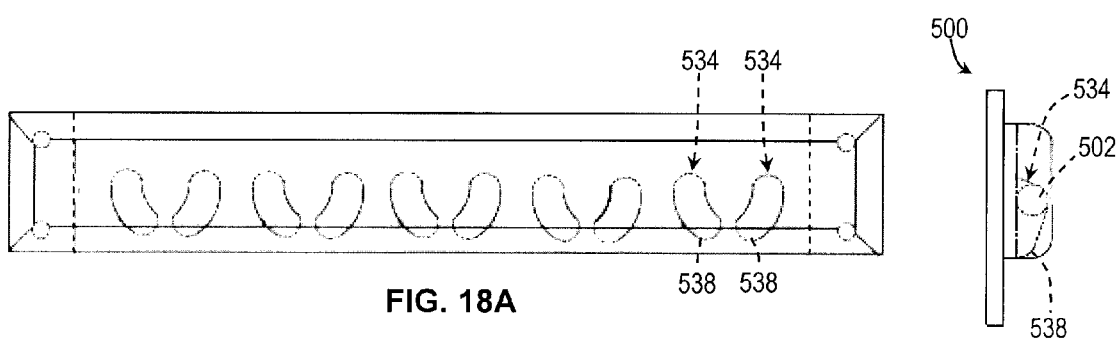
FIG. 18A
FIG. 18B
FIG. 18C

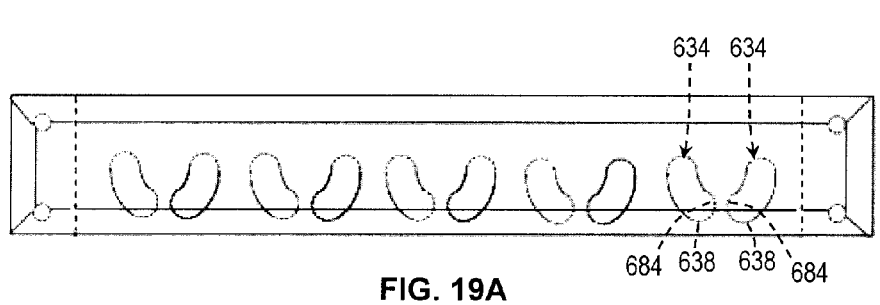
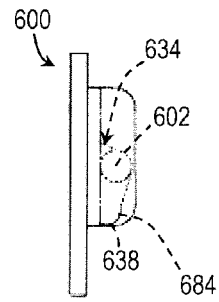
FIG. 19A
FIG. 19B
FIG. 19C
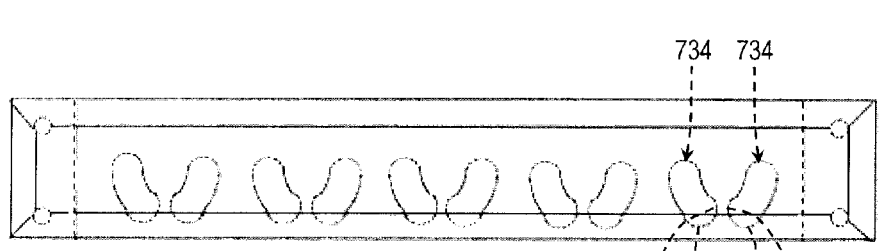
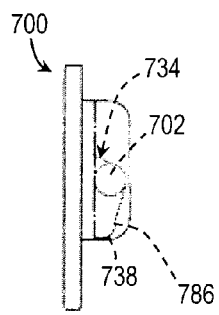
FIG. 20A
FIG. 20B
FIG. 20C

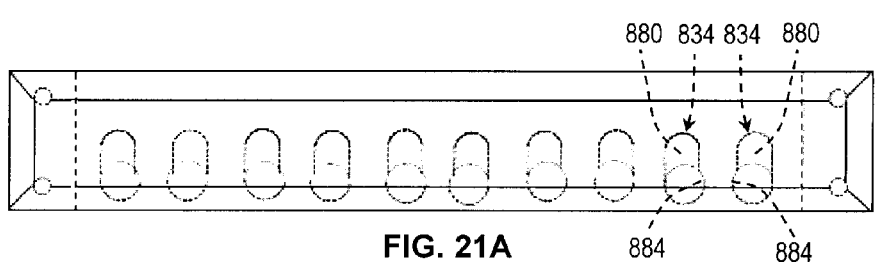
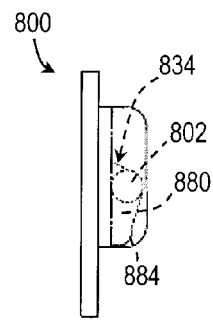
FIG. 21A  FIG. 21C
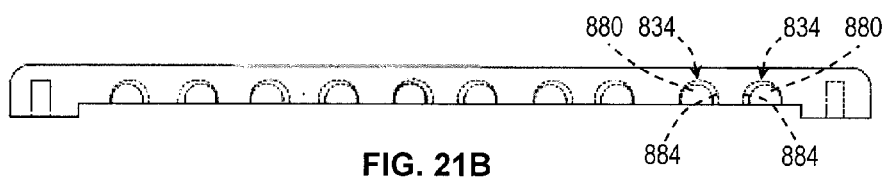
FIG. 21B
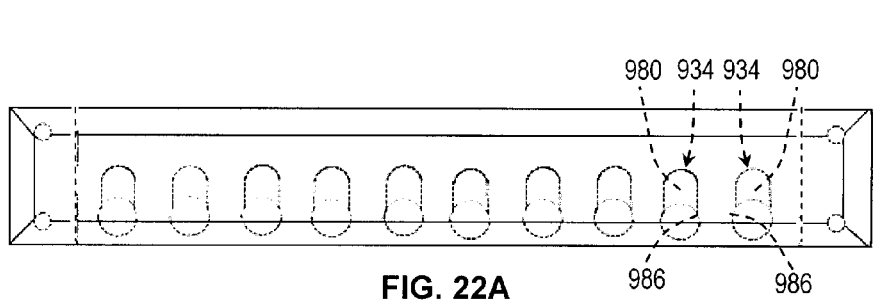
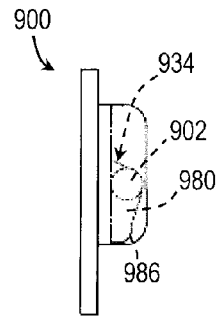
FIG. 22A  FIG. 22C
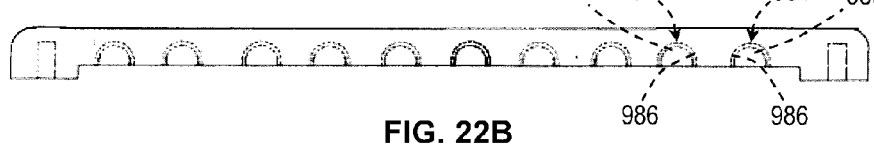
FIG. 22B

SHEET HOLDER

FIELD OF THE INVENTION

The present invention relates generally to sheet holders and, more particularly, to a sheet holder adapted for holding one, or a stack of more than one, sheets.

BACKGROUND

The prior art proposes numerous sheet holders that are useful for holding one sheet, or a relatively small stack of sheet-shape materials such as, for examples, sheets of paper, metal foils, plastic films, or the likes, in a freely suspended attitude along typically a vertical surface such as a wall surface, a door surface, or the likes.

Sheet holders of the prior art are generally represented by a substantially elongated assembly that is typically attached horizontally at a suitable height along a vertical wall surface or a similar vertical support structure. The assembly further generally defines at least one elongated slot along a longitudinal lower front edge thereof for inserting therein the upper edge of one, or a stack of more than one, sheet. The most common sheet holders of the prior art are for holding sheets of paper used in office environments. Sheet gripping means are provided within the cavity of the slot for holding therein an upper edge portion of the sheets.

In some instances, the sheet gripping means are represented by spring loaded gripping elements that need to be simultaneously operated with one hand through a button or small lever while the sheets of paper are inserted in, or retrieved from, the slot using the other hand.

In other instances, the paper gripping means is generally represented by a series of free rolling and gravity operated roller balls or relatively small cylindrical elements that are equidistantly distributed along a lower horizontal edge within the sheet holder. Once the sheets have been inserted in the slot, the roller balls or cylindrical elements freely roll down in the slot to contact with and sufficiently press the sheets against a rear member of the sheet holder. In these instances, only the sheets of paper need to be manipulated in order to insert or retrieve the latter from the sheet holder.

While these prior art sheet holders can generally fulfill the main objective of holding one or more sheets such as sheets of paper in a suspended attitude along a wall surface or the like, they also generally entail one or more of the following disadvantages in achieving this same objective.

For example, the sheet holders of the prior art integrating spring loaded paper gripping means generally require two hands to operate, which is inconvenient. Furthermore, over time, the spring loaded elements generally impinge marks or dents in the surface of the sheets such as sheets of paper, which is generally not desirable either.

In the case of sheet holders of the prior art integrating gravity operated paper gripping means, these devices are typically more prone to holding the sheet at a slightly different angle than their original angle at which they were inserted through the input slot.

For example, the sheet holders integrating a series of individual roller elements, such as spherical rollers or cylindrical rollers, cannot ensure that these rollers all apply an equal gripping pressure against the sheets of paper, which results in an imbalance of load. Consequently, sheets of paper sometime eventually end up being held at an angle relative to the horizontal, or fall off the sheet holder. This problem is more present in sheet holders integrating free rolling cylindrical elements since their gripping pressure applied on the sheets are more evenly distributed along the length of the elements which, in turn, significantly reduces the gripping action on the sheets of paper.

Furthermore, in order to remove the sheets from sheet holders of the prior art integrating gravity operated paper gripping means, typically, the sheets must be forcibly pulled down against the engaging force of the roller elements, which often results in damaging marks on the surface of one or more sheets pulled therefrom.

Another disadvantage of the sheet holders of the prior art resides in that their gripping means are configured such that they are limited to hold sheets of material having surface characteristics closely corresponding to conventional thin sheets of paper used in offices. Thus, these devices can hardly be used to hold sheets made of different materials having varied surface characteristics such as is often encountered in industrial applications. For example, these sheet holders of the prior art can hardly be used for holding sheets of material made of felt, wet fiber-mat, shaggy carpets, semi-rigid textiles, tarpaulin sheets, sheets of soft or hard rubber or foam, corrugated rubber sheets, or the likes.

Against this background, there exists a need for a new and improved sheet holder.

It is a general object of the present invention to provide such a sheet holder.

SUMMARY OF THE INVENTION

In a broad aspect, the invention provides a sheet holder for holding at least one sheet, the sheet holder comprising a housing, the housing defining first and second side walls, the first and second side walls being spaced apart from each other and defining a substantially elongated slot therebetween, the slot defining a slot longitudinal axis and slot top and bottom ends substantially transversely opposed relative to each other, the first and second side walls also defining a bottom aperture leading into the slot at the slot bottom end, the housing also defining a plurality of guiding grooves in the first side wall, each of the guiding grooves facing the slot and defining substantially opposed groove top and bottom ends, the guiding grooves extending further away from the second side wall substantially adjacent the groove top end than substantially adjacent the groove bottom end; and a plurality of holding elements, each of the holding elements being at least partially received in a respective one of the guiding grooves and movable therealong between the groove top and bottom ends, the holding elements being configured and sized so that when the holding elements abut against the second side wall, at least part of the holding elements remains in the guiding grooves at all positions therealong. When the sheet holder is positioned vertically with the slot bottom end below the slot top end and at least part of the at least one sheet is inserted in the slot, the holding elements move towards the groove bottom ends in the guiding grooves and pinch the at least one sheet between the holding elements and second side wall to hold the at least one sheet in the slot.

In some embodiments of the invention, the first and second side walls further define a top aperture leading into the slot at the slot top end.

In some embodiments of the invention, the guiding grooves are substantially rectilinear.

In some embodiments of the invention, the guiding grooves each define an enlarged portion substantially adjacent the groove bottom end, the enlarged portions allowing larger movements of the holding elements in the guiding grooves in a direction substantially parallel to the slot longitudinal axis when the holding elements are in the enlarged portions than elsewhere in the guiding grooves.

In some embodiments of the invention, the guiding grooves are substantially parallel to each other.

In some embodiments of the invention, the guiding grooves are curved.

In some embodiments of the invention, adjacent ones of the guiding grooves alternate between converging and diverging in a direction leading from the slot top end towards the slot bottom end.

In some embodiments of the invention, the slot is substantially parallelepiped shaped.

In some embodiments of the invention, the guiding grooves are deepest substantially adjacent the groove top end and shallowest substantially adjacent the groove bottom end.

In some embodiments of the invention, the holding elements are substantially spherical.

In some embodiments of the invention, the holding elements are substantially dumbbell-shaped. For example, the holding elements include a pair of spaced apart end elements linked to each other through a connecting rod.

In some embodiments of the invention, the guiding grooves each define a pair of substantially parallel recessed portions extending therealong between the groove top and bottom ends for receiving the end elements thereinto.

In some embodiments of the invention, the end elements are substantially spherical. In other embodiments, the end elements are substantially cylindrical.

In some embodiments of the invention, the sheet holder further comprises a control element mounted to the housing for selectively moving the holding elements to a release position, the release position being substantially adjacent the groove top end, the control element being movable between a control element first position and a control element second position, the control element being operatively coupled to the holding elements so that in the control element first position, the holding elements are help in the release position by the control element, and, in the control element second position, the holding elements are freely movable in the guiding grooves.

In some embodiments of the invention, the holding elements are attracted by magnets, and the control element includes a control element body made of a substantially non-magnetizable material and a plurality of magnets mounted to the control element body, the magnets being each in register with the release position of a respective one of the holding elements when the control element is in the control element first position, the magnets being each retracted from the guiding grooves when the control element is in the control element second position.

In some embodiments of the invention, movement of the control element between the control element first and second positions is substantially longitudinal relative to the slot.

In some embodiments of the invention, a parking element is mounted to one of the first and second side walls. In the control element second position, one of the magnets is in register with the parking element and attracts the parking element to resist movements of the control element away from the control element second position.

In some embodiments of the invention, the parking element includes a magnetizable material.

In some embodiments of the invention, the parking element is configured and sized and has magnetic characteristics such as to prevent spontaneous movement of the control element towards the control element second position when the control element is in the control element first position.

In some embodiments of the invention, a pair of longitudinally opposed slot end walls extends between the slot top and bottom ends.

In some embodiments of the invention, the holding elements are provided with a surface texture to increase adhesion with the at least one sheet.

In some embodiments of the invention, the holding elements are covered with an adherence enhancing material to increase adhesion with the at least one sheet.

In some embodiments of the invention, the holding elements and the guiding grooves are configured and sized so that the holding elements are able to be substantially entirely contained in the guiding grooves substantially adjacent the groove top end.

In some embodiments of the invention, the holding elements and the guiding grooves are configured and sized so that the holding elements are able to be substantially half-contained in the guiding grooves substantially adjacent the groove bottom end.

In some embodiments of the invention, the first side wall is made of Teflon(™) (Polytetrafluoroethylene).

In some embodiments of the invention, the second side wall is made of aluminum.

In some embodiments of the invention, the rolling elements are made of steel.

In some embodiments of the invention, the holding elements as made of brass.

In some embodiments of the invention, the guiding grooves are rounded at the groove bottom end.

It should be noted that the different features present in some embodiments recited hereinabove can be combined with each other when not inherently contradictory.

As with sheet holders of the prior art, the holding elements of the present invention operate by gravity for applying pressure against the sheet or sheets of paper inserted through the slot. The difference between the present invention and sheet holders of the prior art resides in part in some embodiments in the shape configuration of the holding elements and their correspondingly shaped and sized guiding grooves provided along the rear portion of the first wall. In some embodiments, this configuration reduces chances that the sheet will change its angle within the slot. Also, structures allowing easy removal of the sheet from the slot with markedly reduced risks of marking the sheet are present in some embodiments. Examples of such structures include the top aperture and the control element.

Although one use of the sheet holder of the present invention is to hold sheets of paper, it is to be understood that the sheet holder may be used to hold one or more sheets made of other materials such as, but not limited to, plastic films, metal foils, relatively thin panels, semi-rigid carpets, or the likes.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 13A to 13D inclusively illustrate another alternate embodiment of a sheet holder, according to the present invention, namely its second member in a front and a bottom plan views in FIGS. 13A and 13B respectively, a side cross-sectional view of the assembled sheet holder in FIG. 13C, and a holding element in perspective view in FIG. 13D;

FIG. 14A to 14D inclusively illustrate yet another alternate embodiment of a sheet holder, according to the present invention, namely its second member in a front and a bottom plan views in FIGS. 14A and 14B respectively, a side cross-sectional view of the assembled sheet holder in FIG. 14C, and a holding element in perspective view in FIG. 14D;

FIG. 15A to 15C inclusively illustrate another yet alternate embodiment of a sheet holder, according to the present invention, namely its second member in a front and a bottom plan views in FIGS. 15A and 15B respectively, and a side cross-sectional view of the assembled sheet holder in FIG. 15C;

FIG. 16A to 16C inclusively illustrate another yet alternate embodiment of a sheet holder, according to the present invention, namely its second member in a front and a bottom plan views in FIGS. 16A and 16B respectively, and a side cross-sectional view of the assembled sheet holder in FIG. 16C;

FIG. 17A to 17C inclusively illustrate yet another alternate embodiment of a sheet holder, according to the present invention, namely its second member in a front and a bottom plan views in FIGS. 17A and 17B respectively, and a side cross-sectional view of the assembled sheet holder in FIG. 17C;

FIG. 18A to 18C inclusively illustrate yet another alternate embodiment of a sheet holder, according to the present invention, namely its second member in a front and a bottom plan views in FIGS. 18A and 18B respectively, and a side cross-sectional view of the assembled sheet holder in FIG. 18C;

FIG. 19A to 19C inclusively illustrate yet another alternate embodiment of a sheet holder, according to the present invention, namely its second member in a front and a bottom plan views in FIGS. 19A and 19B respectively, and a side cross-sectional view of the assembled sheet holder in FIG. 19C;

FIG. 20A to 20C inclusively illustrate yet another alternate embodiment of a sheet holder, according to the present invention, namely its second member in a front and a bottom plan views in FIGS. 20A and 20B respectively, and a side cross-sectional view of the assembled sheet holder in FIG. 20C;

FIG. 21A to 21C inclusively illustrate yet another alternate embodiment of a sheet holder, according to the present invention, namely its second member in a front and a bottom plan views in FIGS. 21A and 21B respectively, and a side cross-sectional view of the assembled sheet holder in FIG. 21C;

FIG. 22A to 22C inclusively illustrate yet another alternate embodiment of a sheet holder, according to the present invention, namely its second member in a front and a bottom plan views in FIGS. 22A and 22B respectively, and a side cross-sectional view of the assembled sheet holder in FIG. 22C;

DETAILED DESCRIPTION

Figure 1:
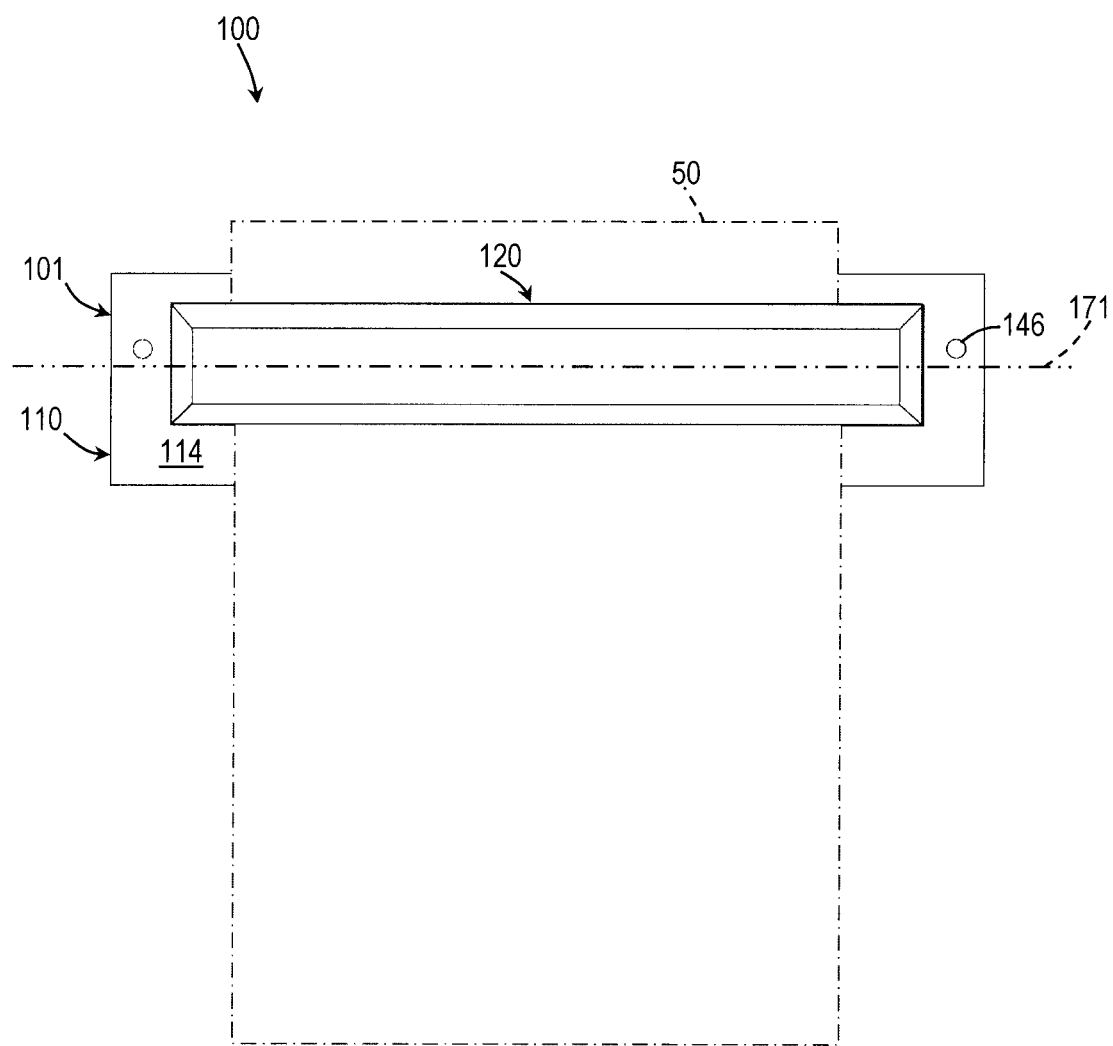
FIG. 1, in a front plan view, illustrates an embodiment of a sheet holder according to the present invention, here shown holding a sheet of paper.

FIGS. 1 to 11 inclusively illustrate various aspects of an embodiment of a sheet holder 100 according to the present invention. For exemplary purposes only, the embodiment of the sheet holder 100 will be described hereinafter as having general characteristics of shape and size that are suitably adapted for holding standard letter size sheets of paper 50, as seen in FIG. 1. It is to be understood that other characteristics of shape and size of a sheet holder 100, according to the present invention, are also possible for holding other formats of sheets made of a different type of material than paper.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology such as up, down, top, bottom and vertical, among others, is used in this document and refer to the sheet holder 100 in an operational configuration to hold sheets 50 substantially vertically. This terminology is used for clarity reasons and should not be used to restrict the scope of the appended claims unless explicitly mentioned in the claims.

Figure 4:
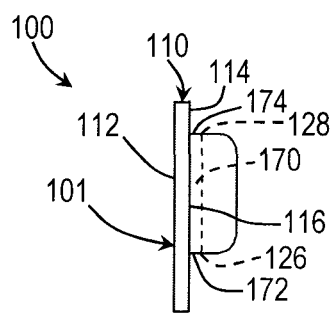
FIG. 4, in a side plan view, illustrates the sheet holder of FIGS. 1 to 3, the opposite side plan view being a mirror image thereof.
Figure 5:
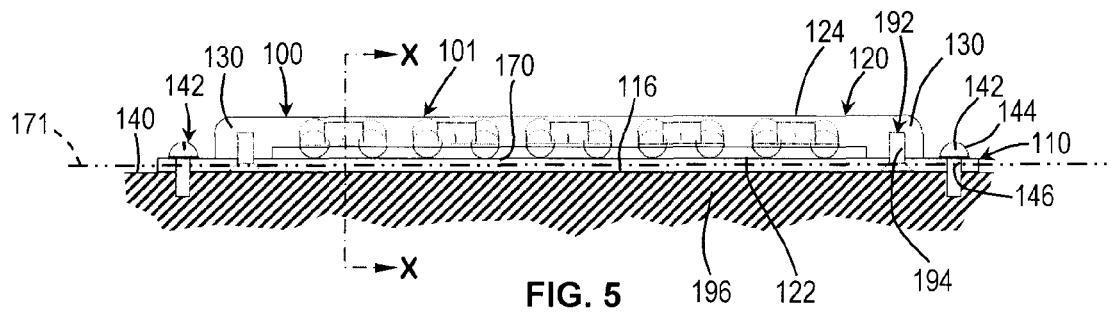
FIG. 5, in a bottom plan view, illustrates the sheet holder of FIGS. 1 to 4, here shown attached to a wall surface.
Figure 6:
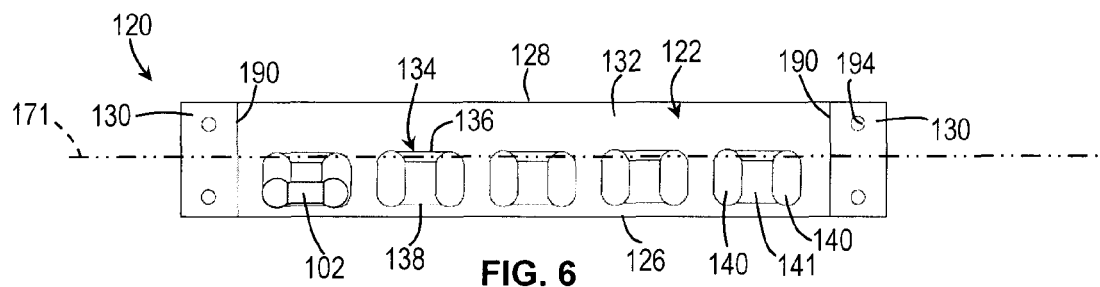
FIG. 6, in a rear plan view, illustrates a second member and a guiding element both part of the sheet holder of FIGS. 1 to 5, the second member being provided with guiding grooves, one of the guiding grooves being shown having the holding element engaged therein.

Referring to FIG. 5 for example, the sheet holder 100 includes a housing 101 defining first and second side walls 120 and 110 and a plurality of holding elements 102 omitted from FIG. 5, but one of which is shown in FIG. 6 for example. The first and second side walls 120 and 110 are spaced apart from each other and define a substantially elongated slot 170 therebetween. The slot 170 defines a slot longitudinal axis 171 and slot bottom and top ends 126 and 128 substantially transversely opposed relative to each other, as seen in FIG. 4. Returning to FIG. 5, typically, a pair of longitudinally opposed slot end walls 130 extend between the slot top and bottom ends 128 and 126. The second side wall 110 is typically integrally formed and forms a first member. Also, the slot end walls 130 typically extend integrally from the first side wall 120, and the first side wall 120 and slot end walls 130 form a second member. The housing 101 is formed of the assembly of the first and second members.

Referring to FIG. 4, the first and second side walls 120 and 110 also define a bottom aperture 172 leading into the slot 170 at the slot bottom end 126. In some embodiments of the invention, the first and second side walls 120 and 110 further define a top aperture 174 leading into the slot 170 at the slot top end 128. However, in alternative embodiments of the invention (not shown in the drawings), the slot 170 is closed a the slot top end 128. Typically, the slot 170 is substantially parallelepiped shaped.

Figure 9:
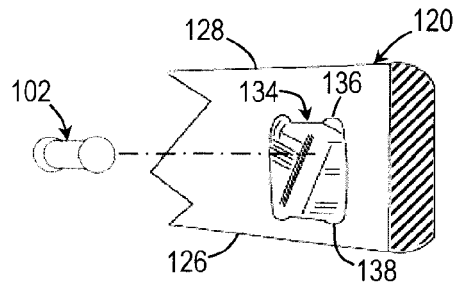
FIG. 9, in a partial perspective view, illustrates the second member of FIGS. 6 and 7, showing one guiding groove and one holding element positioned in alignment therewith.
Figure 10A:
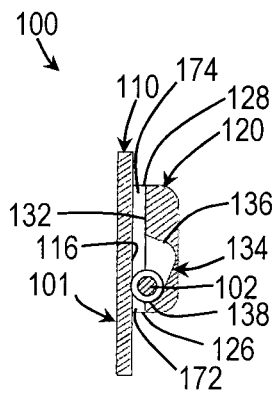
FIG. 10A, in a side cross-sectional view along section line X-X of FIG. 5, illustrates the sheet holder of FIGS. 1 to 5, here showing a holding element in a first position within a guiding groove.
Figure 10B:
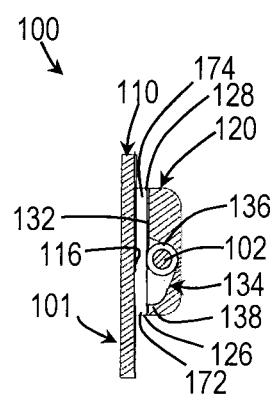
FIG. 10B, in a side cross-sectional view along section line X-X of FIG. 5, illustrates the sheet holder of FIGS. 1 to 5, here showing a holding element in a second position within a guiding groove.

As seen for example in FIG. 9, a plurality of guiding grooves 134 are defined in the first side wall 120. Each of the guiding grooves 134 faces the slot 170 and defines substantially opposed groove top and bottom ends 136 and 138. As seen in FIGS. 10A and 10B, the guiding grooves 134 extend further away from the second side wall 110 substantially adjacent the groove top end 136 than substantially adjacent the groove bottom end 138.

Figure 7:
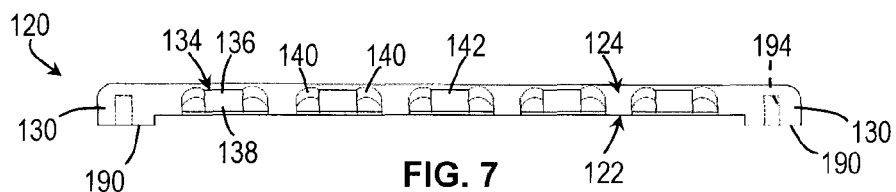
FIG. 7, in a bottom plan view, illustrates the second member of FIG. 6.

FIGS. 5, 6 and 7 illustrate a sheet holder 100 including 5 guiding grooves 134, each configured for receiving a corresponding holding element 102. However, in alternative embodiments of the invention, any suitable number of guiding grooves 134 and corresponding number of holding elements 102 are provided.

Each of the holding elements 102 is at least partially received in a respective one of the guiding grooves 134 and movable therealong between the groove top and bottom ends 136 and 138, as illustrated in FIGS. 10A and 10B. The holding elements 102 are configured and sized so that when the holding elements 102 abut against the second side wall 110, at least part of the holding elements 102 remains in the guiding grooves 134 at all positions therealong.

When the sheet holder 100 is positioned vertically with the slot bottom end 126 below the slot top end 128 and at least part of the at least one sheet 50 is inserted in the slot 170, the holding elements 102 move towards the groove bottom ends 138 in the guiding grooves 134 and pinch the at least one sheet 50 between the holding elements 102 and second side wall 110 to hold the at least one sheet 50 in the slot 170.

Figure 8:
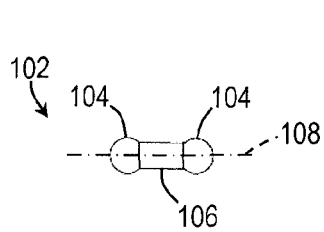
FIG. 8, in a top plan view, illustrates the holding element of FIG. 6.

Now referring more particularly to FIGS. 6, 8 and 9, the holding elements 102 are substantially dumbbell-shaped and typically oriented substantially parallel to the slot longitudinal axis 171. However, in alternative embodiments of the invention, the holding elements 102 have any other suitable alternative shape.

More specifically, with reference to FIG. 8, each holding element 102 includes a pair of spaced apart end elements 104 linked to each other through a connecting rod 106. The connecting rod 106 generally defines a centered rotational axis 108 of the holding element 102. Each end element 104 is substantially spherical in configuration, with a diameter relative to the rotational axis 108 that is at least slightly greater than the diameter of the connecting rod 106.

In an alternate embodiment of a sheet holder 150, as illustrated in FIGS. 13A to 13D inclusively, the holding elements 152 (seen for example in FIG. 13D) includes substantially cylindrically shaped end elements 154 having a relatively short axial length. The end elements 154 are well suited, for example, for holding sheets 50 of material having a substantially rigid and slippery, or polished surface.

In another alternate embodiment of a sheet holder 160, as illustrated in FIGS. 14A to 14D inclusively, the cylindrically shaped end elements 164 of the holding element 162 (seen for example in FIG. 14D) may have a relatively longer axial length relative to the previous embodiment, for holding, for example, relatively softer sheets of material, in order to limit markings thereon.

As it will be described further below, the first side walls 156 and 166 associated with the holding elements 152 and 162 respectively, include guiding grooves 158 and 168 that are sized and configured to allow a vertical rolling movement to the dumbbell-shaped holding elements 152 and 162.

As exemplified in FIGS. 13D and 14D, in some embodiments, the holding elements 152 and 162 are provided with a surface texture to increase adhesion with the at least one sheet 50. For example the surface texture takes the form of surface grooves for enhancing the surface adherence of the holding elements 102, 152 and 162 when contacting a sheet 50 of material engaged in the sheet holder 100. Alternatively, in some other embodiments (not shown), the holding elements 102, 152 or 162 are covered with an adherence enhancing material to increase adhesion with the at least one sheet, for example on the circumferential portions of the end elements 104, 154 or 164. An example of an adherence enhancing material is rubber.

Figure 2:
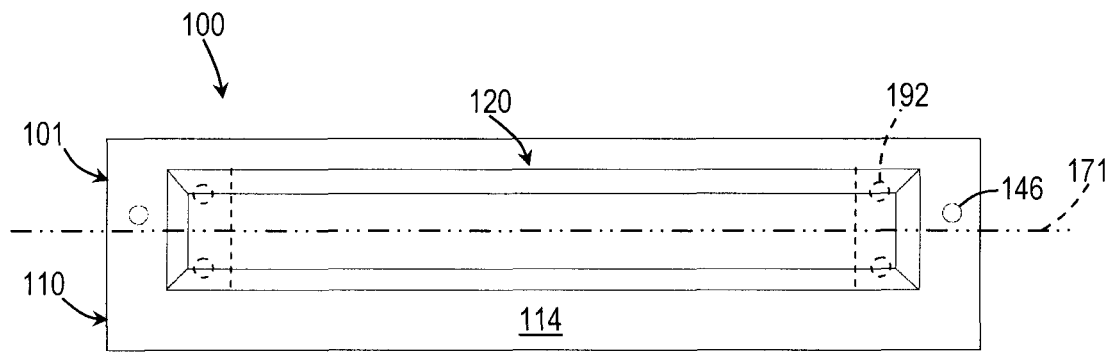
FIG. 2, in a front plan view, illustrates the sheet holder of FIG. 1, shown here without the sheet of paper.
Figure 3:
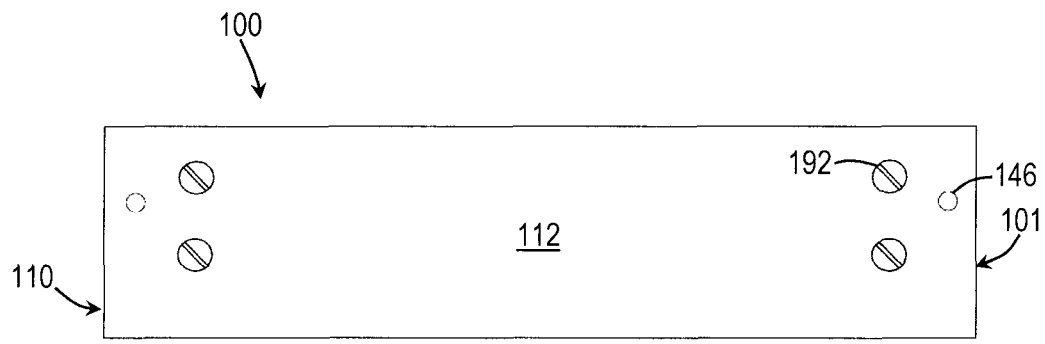
FIG. 3, in a rear plan view, illustrates the sheet holder of FIGS. 1 and 2.

Referring to FIGS. 2 to 4, the second side wall 110 has typically a substantially elongated and horizontally disposed, plate-shaped configuration defining a second side wall rear surface 112 (not seen in FIG. 2) and an opposed second side wall front surface 114 (not seen in FIG. 3).

The second side wall 110 is provided with structure suitable for attachment to a vertical support structure such as, for example a wall 196, as seen in FIG. 5, or an equivalent structure using a conventional attachment 142, as best illustrated in FIG. 5. Conventional attachment 142 is for example represented by a plurality of spaced apart screw 144 and hole 146 combinations. Other equivalent attachments are also possible.

The second side wall front surface 114 defines a substantially centrally disposed second side wall planar portion 116 extending substantially the whole longitudinal length thereof and facing the first side wall 120.

Referring to FIG. 5, the first side wall 120, likewise the second side wall 110, has a substantially elongated and horizontally disposed plate-shaped configuration having overall dimensions that may be substantially equivalent to, but typically slightly smaller than, second side wall 110. The first side wall 120 defines a first side wall rear surface 122, in which the guiding grooves 134 are formed, and an oppositely disposed first side wall front surface 124.

As best illustrated in FIGS. 5, 6 and 7, first side wall rear surface 122 defines a substantially centrally disposed first side wall planar portion 132 extending substantially the whole longitudinal length thereof. First side wall planar portion 132 is provided with the guiding grooves 134 that correspond in number with the number of holding elements 102 described further above. The guiding grooves 134 are preferably disposed in a substantially equidistantly spaced apart and horizontally aligned relationship along the longitudinal length of the first side wall planar portion 132, as best illustrated in FIG. 6. It should be notes that in alternative embodiments of the invention, only one guiding groove 134 is provided. In the presently described sheet holder 100, the guiding grooves 134 are substantially rectilinear and substantially parallel to each other. However, as described hereinbelow, in alternative embodiments, the guiding grooves have any other suitable shape.

Figure 12:
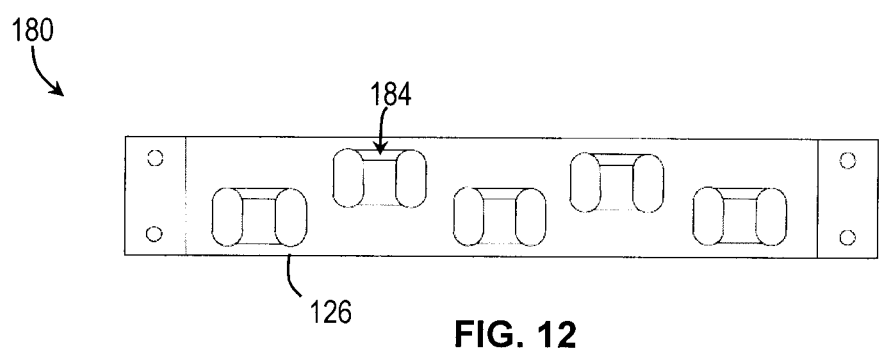
FIG. 12, in a rear plan view, illustrates an alternate embodiment of the second member.

As illustrated in FIG. 12, in an alternate embodiment of a sheet holder according to the present invention, the first side wall 180 is provided with guiding grooves 184 disposed at alternate distances relative to the slot bottom end 126.

Each guiding groove 134 is shaped complementarily to the holding element 102 and as such has a substantially uniform longitudinal cross-sectional configuration therealong, or at least along most of the guiding groove 134. As exemplified, for example, in FIG. 6, each guiding groove 134 is defined by a pair of parallel and vertically extending recessed portions 140 extending therealong for receiving the end elements 104 and a shallower central portion 141 extending therebetween. Typically, the guiding grooves 134 are deepest substantially adjacent the groove top end 136 and shallowest substantially adjacent the groove bottom end 138, as illustrated in FIG. 9 for example.

Each guiding groove 134 is shaped and sized for freely rollably receiving therein a compatibly shaped holding element 102 such that the latter may freely roll between the groove top end 136 and the groove bottom end 138.

Furthermore, the holding elements 102 and the guiding grooves 134 are configured and sized so that the holding element 102 is able to be substantially entirely contained in the guiding grooves 134 substantially adjacent the groove top end 136, as seen in FIG. 10B, and so that the holding element 102 is able to be substantially half-contained in the guiding grooves 134 substantially adjacent the groove bottom end 138, as seen in FIG. 10A. Thus, there is defined a roller element first position as illustrated in FIG. 10A, in which the holding element is half-concealed in the guiding groove 134 substantially adjacent the guiding groove bottom end 138, with the holding element 102 being gradually substantially fully concealed within the guiding groove 134 when rolled upward substantially proximal the groove top end 136 thereof, thus defining a roller element second position as illustrated in FIG. 10B.

The end walls 190 are attached to corresponding portions of the second side wall front surface 114, for example using conventional attachment means such as screws 192 and threaded hole 194 combinations as exemplified in the drawings in FIG. 5 for example, a soldering process, a high strength epoxy glue, or the likes.

The end walls 190 are sized and shaped such that the first side wall planar portion 132 is parallelly opposed substantially proximal the second side wall planar portion 116. Furthermore, first side wall planar portion 132 is distanced from second side wall planar portion 116 such that, when the holding elements 102 are in the roller element first position, as illustrated in FIG. 10A, a circumferential portion thereof abuts against second side wall planar portion 116.

Figure 11:
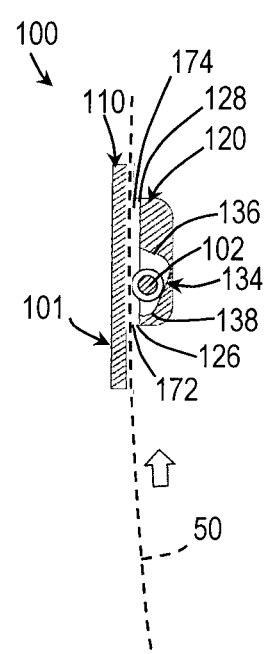
FIG. 11, in a side cross-sectional view along section line X-X of FIG. 5, illustrates the sheet holder of FIGS. 1 to 5, here shown holding a sheet of paper.

As best illustrated in FIGS. 10A, 10B and 11, the second side wall planar portion 116, end walls 190, and the first side wall planar portion 132 cooperatively forms the horizontally elongated and rectangularly shaped slot 170 extending between the slot bottom and top ends 126 and 128.

For example, considering a sheet holder 100 that is configured and sized for holding one, or a relatively small stack of standard letter sheets of paper 50, slot 170 may have dimensions for freely receiving therethrough a stack of about ten 8.5 inches wide (about 20 cm wide) sheets of paper 50.

Furthermore, the first side wall 120 is preferably shaped and sized for providing support such that all the holding elements 102 effect relatively uniform contacting force along the whole width of the sheets 50 of material engaged in the sheet holder 100.

Second side wall 110, first side wall 120 and the holding elements 102 are preferably made of a suitably rigid material, or combination of materials, such as, for example, steel, brass, aluminum, a suitably rigid metal alloy, nylon, Teflon (™) (polytetrafluoroethylene), PVC, ABS, or the likes. Tests have demonstrated that especially good efficiency may be achieved with holding elements 102 made of steel or brass, and with first and second side walls made of Teflon(™) (polytetrafluoroethylene) and aluminum respectively. However, other materials may also be used in other embodiments of the invention.

The operation of the sheet holder 100 is described hereinbelow through a typical method of using the sheet holder 100.

With the sheet holder 100 firmly attached to a substantially vertical surface such as a wall 196, in a first step, the upper edge of one, or of a stack of sheets of paper 50, is manually inserted in the slot 170 through the bottom aperture 172 until it at least slightly protrudes through the top aperture 174. As illustrated in FIG. 11, by inserting the sheets 50 therethrough, their upper edges are directed between the second side wall planar portion 116 and the holding elements 102, which tend to freely roll up the guiding grooves 134 as the sheets 50 are progressively inserted.

Once the sheets 50 are released from the hand of the user, the sheets 50 are then substantially firmly held by the sheet holder 100, between the second side wall planar portion 116 and the holding elements 102, which, by gravity, tend to roll back downwards and towards the sheet or sheets of paper 50 due to the gradually shallower depth of the guiding grooves 134 in the direction leading towards the groove bottom end 138.

Thus the sheets 50, being effectively firmly engaged and held between the second side wall planar surface 116 and the holding elements 102, are prevented from falling downward and out of the bottom aperture 172.

Furthermore, as the end elements 104 of each holding element 102 are mechanically linked in pairs through their respective connecting rod 106 and, thus, act in tandem, the sheet or sheets of paper 50 are less likely to gradually slip at an angle or simply fall off the sheet holder 100 over time, compared to prior art devices.

In a second step, to remove the sheet or sheets of paper 50 from the sheet holder 100, the upper portion of sheets 50 protruding from the top aperture 174 are simply manually pulled upward until the sheets 50 are freed therefrom. This particular approach effectively reduces or even eliminates the risk of leaving marks on the surface of the sheet 50 or sheets 50 that are thus released from the sheet holder 100, compared to prior art sheet holders, which generally require the sheets 50 to be forcibly pulled down against the gripping force of the holding elements of the device.

The following embodiments of a sheet holder, according to the present invention, are substantially similar to the embodiments of the sheet holder 100 described heretofore, including one of the main characteristics concerning the tandem aspect of the holding elements 102.

As it will be illustrated in FIGS. 15A to 22C inclusively, the main difference of the following embodiments compared to the previous embodiments resides in that the tandem aspect is achieved through two individual guiding elements that act in tandem through two adjacent guiding grooves that are suitably shaped to force the guiding elements in an interacting pair, instead of two end elements in pair through a connecting rod.

The following embodiments of a sheet holder that are described hereinafter may be particularly useful for securely holding sheets 50 made of a material, or composition of materials having surface characteristics that may substantially differ from paper. For examples, such surface characteristics may be surface resiliency and/or texture. Typical examples of materials having surface characteristics that differ substantially from paper are sheets of felt, wet fiber-mat, shaggy carpets, semi-rigid textiles, tarpaulin sheets, sheets of soft or hard rubber or foam, corrugated rubber sheets, spongy sheet material, ultrafine and heavy coarse sandpaper, and the likes. Thus, the following embodiments may be particularly useful in industrial applications.

FIG. 15C illustrates an alternate embodiment of a sheet holder 200, according to the present invention. Sheet holder 200 is provided with at least one, but typically a plurality of pairs of guiding grooves 234 disposed in a substantially spaced apart relationship along the first side wall planar portion 232 of its first side wall 220, as also seen in FIGS. 15A and 15B.

Referring to FIG. 15A, each guiding groove 234 in a pair has a substantially rectilinear central portion 280 and are rounded at the groove bottom and top ends 238 and 236. The guiding groove 234 is configured and sized such that a substantially spherical holding element 202 may be substantially fully concealed within the guiding groove 234 when positioned proximal the groove top end 236, and substantially half concealed therein when rolled down proximal the groove bottom end 238, as illustrated in FIG. 15C.

Furthermore, returning to FIG. 15B, the guiding grooves 234 in a pair have their respective groove top end 236 spaced apart a distance that is at least slightly greater than the distance separating their respective groove bottom end 238. In other words, adjacent ones of the guiding grooves 234 alternate between converging (within each pair) and diverging (between pairs) in a direction leading from the slot top ends 128 towards the slot bottom ends 126. Thus, by gravity, the paired guiding grooves 234 force their respective holding elements 202 gradually towards one another as they roll down the guiding grooves 234. The paired spherical holding elements 202 gradually apply pressure on the sheet 50 of material (not seen in FIGS. 15A to 25C) simultaneously in two directions, namely towards the second side wall 210 (seen in FIG. 15C) as well as towards each other in a pinching action on the laterally extending portion of sheet 50 of material positioned therebetween.

The advantage provided by these paired configurations of guiding grooves 234 and holding elements 202 over other gravity operated holding elements of the prior art is that they represent mutually linked pairs, or tandems of holding elements 202 in contact with the sheets 50 of material, instead of individually operating holding elements applying pressure on selected portions thereof.

This particular configuration may be useful for holding sheets 50 made of a substantially resilient material such as felt, foam, a soft rubber, or the likes.

FIGS. 16A, 16B and 16C inclusively illustrate various aspects of another alternate embodiment of a sheet holder 300, seen entirely in FIG. 16C, according to the present invention. Sheet holder 300 is substantially similar to sheet holder 200 described in the precedent embodiment, except that it further includes an enlarged portion 384 substantially adjacent the groove bottom end 338. The enlarged portions 384 allowing larger movements of the holding elements 302 in the guiding grooves 334 in a direction substantially parallel to the slot longitudinal axis 171 when the holding elements 302 are in the enlarged portions 384 than elsewhere in the guiding grooves 334. In the embodiment of the invention shown in the drawings, the enlarged portion 384 allows the holding element 302 engaged therein to roll further inwardly within each pair of guiding grooves 334 relative to the general rectilinear configuration of the guiding groove 334 as the enlarged portion is inwardly offset relative to the remainder of the guiding groove 334. The enlarged portion 384 is useful to securely force the holding elements 302 in a locked engagement against the sheet 50 of material as well as towards one another. This particular configuration may be useful for holding sheets 50 having, for example, a finely grained surface such as fine sandpaper.

FIGS. 17A, 17B and 17C inclusively illustrate various aspects another alternate embodiment of a sheet holder 400 (shown entirely in FIG. 17C, according to the present invention. Sheet holder 400 is substantially similar to sheet holder 300 described previously, except that it further includes an alternative enlarged portion 486 in the guiding groove 434, which allows larger movements of the holding elements 402 in both directions, towards each other and away from each other, in the enlarged portion 486 than elsewhere in the guiding groove 434. The enlarged portion 486 is useful for securely force the holding elements 402 in a locked engagement against the surface of a sheet of material 50 as well as towards one another. This particular configuration leaves room for the holding elements 402 to self-engage in the deepest depressions within a surface of a sheet of material having substantially corrugated or large grain surface characteristics, such as an engraved or embossed sheet of metal, coarse-grain sandpaper, or the likes.

FIGS. 18A to 18C, 19A to 19C and 20A to 20C inclusively illustrate yet other alternate embodiments of a sheet holder 500, 600 and 700 respectively, entirely shown in FIGS. 18C, 19C and 20C, according to the present invention. Sheet holders 500, 600 and 700 are substantially similar to sheet holders 200, 300 and 400 respectively, as described further above. Notably, the groove bottom ends 538, 638 and 738 are rounded in the sheet holder 500, and include an enlarged portion 684 and 786 respectively in the sheet holders 600 and 700.

The difference common to the present three embodiments, relative to the previous three embodiments, resides in that their paired guiding grooves 534, 634 and 734 all have their respective lower end portions at least slightly curved towards one another instead of being substantially rectilinear. In other words, the guiding grooves are curved 534, 634 and 734. The curved guiding grooves 534, 634 and 734 are useful for further improving the engaging force of the holding elements 502, 602 and 702 contacting the sheets of material 50, which can be particularly useful for holding substantially resilient and wet sheets of material such as, for example, wet fiber-mats or shaggy carpets.

FIGS. 21A, 21B and 21C inclusively illustrate various aspects of another alternate embodiment of a sheet holder 800 according to the present invention. Sheet holder 800, shown entirely in FIG. 21C only, is substantially similar to sheet holder 300 described previously, including the rectilinear central portion 880 and the enlarged portion 884. The difference of the sheet holder 800 relative to sheet holder 300 resides in that the paired guiding grooves 834 are disposed substantially parallelly vertically, instead of being at an angle towards each other. Thus, although the paired guiding grooves 834 are not at an angle towards one another, their adjacent enlarged portions 884 still forces the holding elements 802 to act in pairs by being forced towards one another as the enlarged portions are pairwise offset towards each other in pairs of guiding grooves 834. This particular configuration may be useful for holding sheets 50 having, for example, a finely grained surface such as fine sandpaper.

FIGS. 22A, 22B and 22C inclusively illustrate various aspects of yet another alternate embodiment of a sheet holder 900, seen entirely only in FIG. 22C, according to the present invention. Sheet holder 900 is substantially similar to sheet holder 400 described previously, including the rectilinear central portion 980 and the enlarged portion 986.

The difference of the present embodiment relative to sheet holder 400 resides in that the guiding grooves 934 are disposed substantially parallelly vertically, instead of being at an angle relative to one another. Thus, the guiding grooves 934 do not include any configuration aspect that would define purposely paired recesses. Still, in operation, the enlarged portions 986 allows two adjacent holding elements 902 to cooperatively act in paired relation by being self-tossed towards one another due to, for examples, particularly large embossing in a sheet of metal, particularly large coarse-grain sandpaper, or the likes. Although not all individual holding elements 902 might thus end up paired with another, the probability that some pair of holding elements 902 are directed towards one another is sufficient to achieve the desired enhanced gripping action of the sheet holder 900 over prior art devices.

Figure 23A:
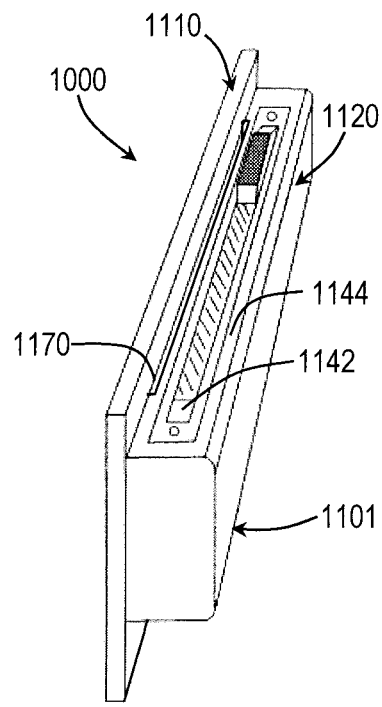
FIG. 23A, in a perspective view, illustrates yet another alternate embodiment of a sheet holder, according to the present invention.

FIG. 23A illustrates yet another alternate embodiment of a sheet holder 1000, according to the present invention. Sheet holder 1000 is substantially similar to the first embodiment of a sheet holder 100 described further above. Likewise sheet holder 100, sheet holder 1000 generally includes a second side wall 1110 attachable to a vertical support structure, a first side wall 1120 parallel and spaced apart from the second side wall 1110, and a substantially elongated slot 1170 extending between the first and second side wall 1120 and 1110.

In some alternate embodiments of a sheet holder (not shown in the drawings), the slot 1170 may only have a single opening (not visible in FIG. 23A) along a lower edge portion thereof (e.g., slot 1170 does not extends vertically all the way through the gap between first and second side walls 1120 and 1110), since the aperture along the upper surface of the first side wall 1120 may be optional. This optional aperture will be more apparent from the following description of the present embodiment 1000.

Figure 24A:
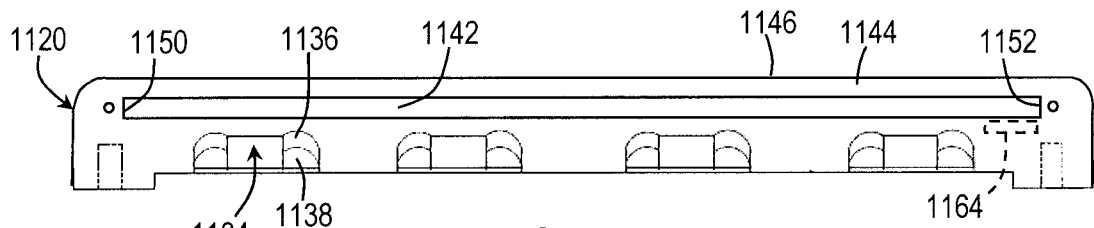
FIG. 24A, 24B and 24C, in a top plan view, illustrate a second member of the sheet holder shown in FIG. 23A, here shown respectively without a control element and holding elements, assembled with a control element and holding elements configured in a first position and, finally, assembled with a control element and holding elements configured in a second position.
Figure 24B:
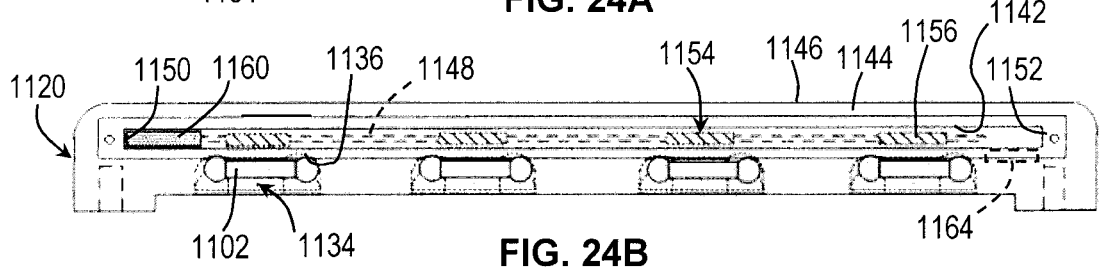
Figure 24C:
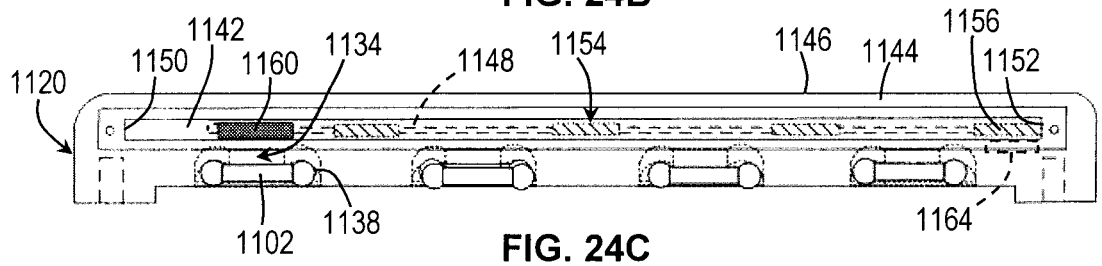

As illustrated in FIG. 24B and 24C, sheet holder 1000 also generally includes a plurality of dumbbell shaped holding elements 1102 freely rollably engaged in a corresponding number of spaced apart and compatibly shaped guiding grooves 1134 extending in the first side wall 1120 from the slot 1170.

Now referring more particularly to FIGS. 23B, 24A, 24B and 24C, the difference of the present embodiment of a sheet holder 1000 relative to sheet holder 100 substantially resides in that sheet holder 1000 further includes a control element 1140 mounted to the housing 1101(as seen in FIG. 23A) in any suitable manner for selectively moving the holding elements 1102 to a release position, the release position being substantially adjacent the groove top end 1136. The control element 1140 is movable between a control element first position, as seen in FIG. 24B, and a control element second position, as seen in FIG. 24C. The control element 1140 is operatively coupled to the holding elements 1102 so that in the control element first position, the holding elements 102 are help in the release position by the control element 1140, and, in the control element second position, the holding elements 102 are freely movable in the guiding grooves 1134.

In a specific embodiment of the invention, as seen in FIGS. 24B and 24C, the control element 1140 is slidably engaged in a suitably configured and sized control element slot 1142 extending generally parallel to the slot 1170 in the first side wall 1120. The control element slot 1142 extends longitudinally and perpendicularly inwardly relative to a first side wall top surface portion 1144 of the first side wall 1120, between the guiding grooves 1134 and a front surface portion 1146 of the first side wall 1120. In this embodiment, movement of the control element 1140 between the control element first and second positions is substantially longitudinal relative to the slot 1170.

Figure 23B:
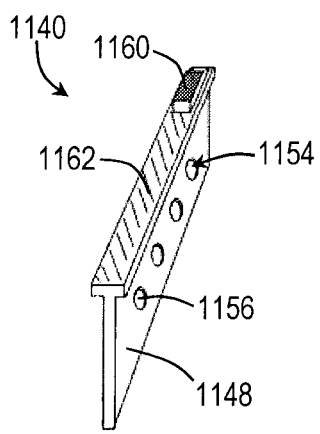
FIG. 23B, in perspective view, illustrates a control element part of the sheet holder shown in FIG. 23A.

Referring to FIG. 23B, the control element 1140 includes a control element body 1148 made of a substantially non-magnetizable material such as aluminum, a polymeric material, or the likes. The control element body 1148 is configured and sized relative to the control element slot 1142 such that it is freely slidably movable longitudinally therein between a control element first position wherein a first end of the control element body 1148 is substantially adjacent a control element slot first end 1150, and a control element second position wherein an opposite end of the control element body 1148 is substantially adjacent a control element slot second end 1152, as seen respectively in FIGS. 24B and 24C. Control element body 1148 further includes a plurality of magnets 1154 in corresponding number relative to the number of holding elements 1102. The magnets 1154 are mounted to the control element body 1148, for example by being attached thereto or embedded therein. The magnets 1154 are spaced apart from each other such that in the control element first position, each magnet 1154 is substantially in register with the groove top end 1136 of a respective guiding groove 1134, as seen in FIG. 24B. The magnets 1154 are each retracted from the guiding grooves 1134 when the control element body 1148 is in the control element second position, for example by begin located between two guiding grooves 1134, as illustrated in FIG. 24C.

Furthermore, the holding elements 1102 are attracted by magnets 1154, for example by being made of a magnetizable ferrous metal such as steel or equivalent. However, in alternative embodiments, the holding elements 1102 may include a magnet instead of being magnetizable. The magnets 1154 are configured and sized, and have suitably strong magnetic characteristics such that when each magnet 1154 is substantially in register with the groove top end 1136 of a respective guiding groove 1134, the holding element 1102 rollably engaged therein is sufficiently magnetically attracted by the magnet 1154 such that it is raised from a lower most position, at the guiding groove bottom end 1138, within the guiding groove 1134, to substantially adjacent the groove top end 1136 thereof to achieve the release position.

Referring for example to FIG. 23B, the control element 1140 may further include a button 1160 attached to a control element body upper edge 1162, for manually operating the control element 1140 between the control element first and second positions thereof. Other configurations of an actuator to allow this movement are also possible.

Furthermore, in some embodiments, a parking element 1164 (seen in FIGS. 24A to 24C) is mounted to one of the first and second side walls 1120 and 1110, to first side wall 1120 in the present case. In the control element second position, one of the magnets 1154 is in register with the parking element 1164 and attracts the parking element 1164 to resist movements of the control element 1140 away from the control element second position. For example the parking element 1164 is made of a magnetizable ferrous metal and is attached or otherwise embedded in a suitable position substantially proximal the control element slot second end 1152 of the first side wall 1120 and substantially proximal an end magnet 1156 of the control element 1140 when the latter is in the control element second position, as illustrated in FIG. 24C (with the holding elements 1102 released from the magnetic attraction of the magnets 1154). However, in alternative embodiments of the invention, the parking element 1164 includes a control element magnet suitably oriented.

The parking element 1164 is for self magnetically attracting the end magnet 1156 and, thus, the control element 1140 towards, and magnetically restricting the movement thereof to, a position substantially in register with the control element second position, as illustrated in FIG. 24C. The parking element 1164 is configured and sized and has magnetic characteristics such as to prevent spontaneous movement of the control element 1140 towards the control element second position when the control element 1140 is in the control element first position. The parking element 1164 is typically further configured and sized and has magnetic characteristics such that the magnetic attraction between the latter and the end magnet 1156 is only sufficient for self-attracting the control element 1140 from a relatively short distance from to the control element second position. Thus, the parking element 1164, in cooperative relation with the end magnet 1156, forces the slidable control element 1140 to being positively positioned proximal the control element second position once a user has selectively operated the control element 1140 from the control element first position towards the control element second position and, hence, prevents any partial magnetic attraction of the magnets 1154 on the holding elements 1102.

It is to be understood that the relative position of each magnet 1154 within the control element body 1148, and the relative position of the parking element 1164 within the first side wall 1120, may be configured such that the holding elements 1102 are released from the magnetic attraction of the magnets 1154 when the control element 1140 is moved towards the control slot first end 1150 (in other words inversely to what is as illustrated in FIGS. 24B and 24C).

Thus, the control element 1140 is selectively slidably movable between the control element first position, wherein the holding elements 1102 are magnetically raised substantially proximal the groove top end 1136 of their respective guiding groove 1134, and the control element second position, wherein the holding elements 1102 are released from a magnetic effect and fall by gravity towards the groove bottom end 1138 of their respective guiding groove 1134.

Likewise every embodiments of a sheet holder described in the present specification, when the holding elements 1102 are magnetically raised by the magnets 1154 towards the groove top end 1136, such as when the control element 1140 is in the control element first position, any sheet or sheets of paper 50 engaged within the elongated slot 1170 are released therefrom. While, when the holding elements 1102 are magnetically released by the magnets 1154, such as when the control element 1140 is in the control element second position, any sheet or sheets of paper 50 having a portion inserted through the slot 1170 are lockingly engaged between the holding elements 1102 and the second side wall 1110 and, thus prevented from falling off therefrom.

A method of using the sheet holder 1000 is as follows. In a first step, with the control element 1140 positioned in the control element second position, as illustrated in FIG. 24C, a top portion of a sheet 50 or a stack of sheets of paper 50 may be inserted through a lower end of the slot 1170, which lockingly engage the latter therein. To selectively release the sheets of paper engaged in the sheet holder 1000, a user may manually slide momentarily or more permanently the control button 1160 towards the control element first position.

Although sheet holder 1000 has been described as a sheet holder that closely resemble the first embodiment of a sheet holder 100 described further above, it is to be understood that the arrangement represented by the control element 1140, control element slot 1142 and parking element 1164 described above may be applied to any one of the other previously described embodiments of the present invention having differently configured guiding groove and holding element combinations.

Figure 25A:
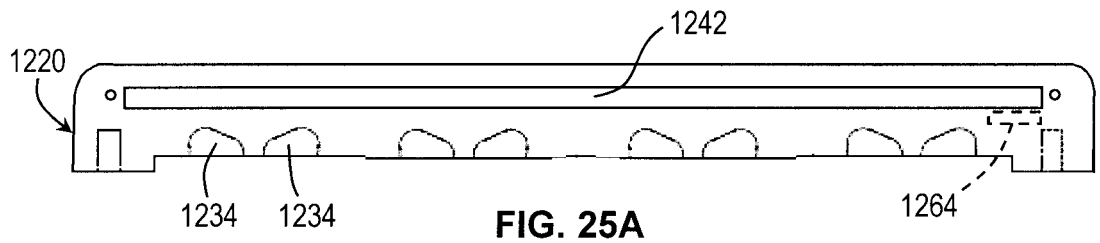
FIG. 25A, 25B and 25C: in a top plan view, illustrate a second member of yet another alternate embodiment of a sheet holder according to the present invention, here shown respectively without a control element and holding elements, assembled with a control element and holding elements configured in a first position and, finally, assembled with a control element and holding elements configured in a second position.
Figure 25B:
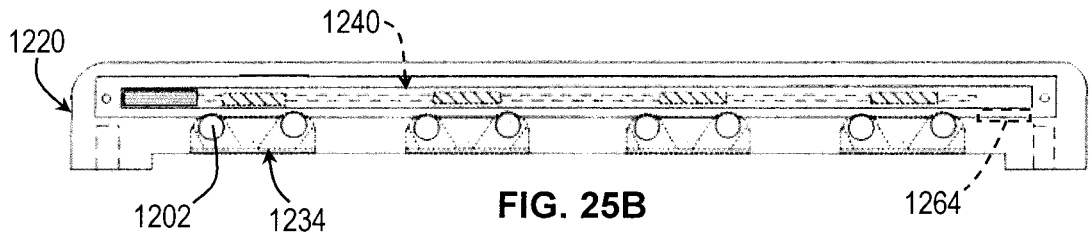
Figure 25C:
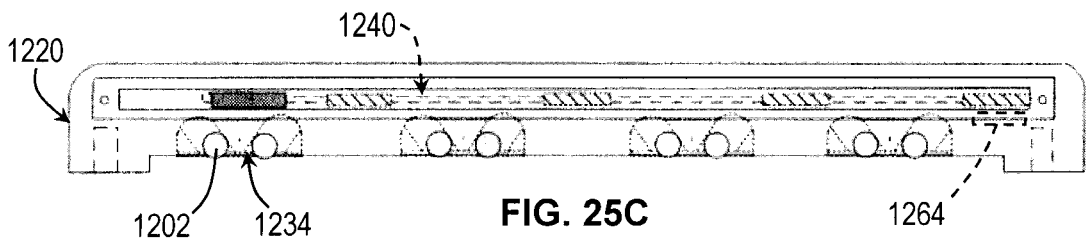

For example, FIG. 25A, 25B and 25C exemplifies an alternate embodiment of a first side wall 1220 of a sheet holder equipped with a control element 1240, a control element slot 1242, and parking element 1264 and having guiding grooves 1234 and spherical holding elements 1202 combinations having configurations that closely resemble the first side wall 220 illustrated in FIGS. 15A, 15B and 15C.

As is obvious to someone familiar in the art, some of the embodiments described in the present specification may further include one or more light emitting diodes (LED) suitably positioned along preferably a lower edge portion of the second member, for illuminating at least a portion of the visible surface of the sheet or sheets of paper engaged in the sheet holder. The LED's are operatively coupled through electrical conductors with a suitably positioned control switch and a battery encased in a battery compartment embedded in the second member.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A sheet holder for holding at least one sheet, said sheet holder comprising:
   a housing, said housing defining first and second side walls, said first and second side walls being spaced apart from each other and defining a substantially elongated slot therebetween, said slot defining a slot longitudinal axis and slot top and bottom ends substantially transversely opposed relative to each other, said first and second side walls also defining a bottom aperture leading into said slot at said slot bottom end, said housing also defining a plurality of guiding grooves in said first side wall, each of said guiding grooves facing said slot and comprising substantially opposed a top end having a top end portion positioned at a first distance from the second side wall and a bottom end having a bottom end portion positioned at a second distance from the second side wall such that the first distance is greater than the second distance; and a plurality of holding elements, each of said holding elements being at least partially received in a respective one of said guiding grooves and movable therealong between said groove top and bottom ends, said holding elements being configured and sized so that when said holding elements abut against said second side wall, at least part of said holding elements remains in said guiding grooves at all positions therealong;

wherein adjacent ones of said guiding grooves alternate between converging and diverging in a direction leading from said slot top end towards said slot bottom end;

whereby, when said sheet holder is positioned vertically with said slot bottom end below said slot top end and at least part of said at least one sheet is inserted in said slot, said holding elements move towards said groove bottom ends in said guiding grooves and pinch said at least one sheet between said holding elements and second side wall to hold said at least one sheet in said slot a pair of longitudinally opposed slot end walls extending between said slot top and bottom ends, the slot being defined between the slot end walls.

2. A sheet holder as defined in claim 1, wherein said first and second side walls further define a top aperture leading into said slot at said slot top end.

3. A sheet holder as defined in claim 1, wherein said guiding grooves are substantially rectilinear.

4. A sheet holder as defined in claim 1, wherein said slot is substantially parallelepiped shaped.

5. A sheet holder as defined in claim 1, wherein said guiding grooves are deepest substantially adjacent said groove top end and shallowest substantially adjacent said groove bottom end.

6. A sheet holder as defined in claim 1, wherein said holding elements are substantially spherical.

7. A sheet holder as defined in claim 1, wherein said holding elements and said guiding grooves are configured and sized so that said holding elements are able to be substantially entirely contained in said guiding grooves substantially adjacent said groove top end.

8. A sheet holder as defined in claim 1, wherein said first side wall is made of polytetrafluoroethylene.

9. A sheet holder as defined in claim 1, wherein said guiding grooves are rounded at said groove bottom end.

* * * * *